United States Patent
Hainz et al.

(10) Patent No.: US 6,708,549 B2
(45) Date of Patent: Mar. 23, 2004

(54) METHOD AND DEVICE FOR MOULDING A TRIPOD SPIDER

(75) Inventors: Volker Hainz, Heusenstamm (DE);
Norbert Hofmann, Ronneburg (DE);
Michael Ricks, Nidderau (DE)

(73) Assignee: GKN Löbro GmbH, Offenbach (DE)

( * ) Notice: Subject to any disclaimer, the term of this patent is extended or adjusted under 35 U.S.C. 154(b) by 0 days.

(21) Appl. No.: 10/148,251

(22) PCT Filed: Aug. 2, 2001

(86) PCT No.: PCT/EP01/08959
§ 371 (c)(1),
(2), (4) Date: Aug. 26, 2002

(87) PCT Pub. No.: WO02/26418
PCT Pub. Date: Apr. 4, 2002

(65) Prior Publication Data
US 2003/0029217 A1 Feb. 13, 2003

(30) Foreign Application Priority Data
Sep. 28, 2000 (DE) .......................... 100 49 239

(51) Int. Cl.⁷ ................................................. B21K 1/74
(52) U.S. Cl. ........................................ 72/353.2; 72/360
(58) Field of Search ....................... 29/898.052; 72/352, 72/353.2, 355.6, 360, 356

(56) References Cited

U.S. PATENT DOCUMENTS

| 4,918,970 A | * | 4/1990 | Ishinaga ................. 72/355.6 |
| 4,936,133 A | | 6/1990 | Orain |
| 5,174,147 A | | 12/1992 | Bottger |
| 5,538,473 A | | 7/1996 | Busch et al. |

FOREIGN PATENT DOCUMENTS

| DE | 39 09 432 A1 | 10/1989 |
| DE | 92 18 285 U1 | 5/1994 |

* cited by examiner

*Primary Examiner*—Lowell A. Larson

(57) ABSTRACT

A method of and device for forming a tripode star for a tripode joint, which tripode star comprises an annular hub member and three arms which adjoin the hub member, extend radially relative to a longitudinal axis (A) and form faces of spherical portions each positioned circumferentially relative to arm axes (Z) of the arms, wherein, in a first production stage, the hub member and the three arms are preformed from a blank by means of a first tool divided in a plane (E1) containing the arm axes (Z) and wherein, in a second production stage, pairs of burr-free faces of spherical portions positioned opposite one another in the circumferential direction relative to the hub member (12) are formed on to the preformed arms by means of a second tool divided in planes extending through the longitudinal axis (A) of the hub member and through the arm axes (Z).

20 Claims, 4 Drawing Sheets

DETAIL "X"

METHOD AND DEVICE FOR MOULDING A TRIPOD SPIDER

BACKGROUND OF THE INVENTION

The invention relates to a method of and device for forming a tripode star for a tripode joint, which tripode star comprises an annular hub member and three arms which adjoin the hub member, extend radially relative to the longitudinal axis of the hub member and which each form faces of spherical portions positioned circumferentially relative to the arm axes of the arms. Tripode stars of said type are used in tripode joints wherein roller carriers for the rollers are arranged on the tripode arms, which roller carriers are each provided with axial bores engaged by the tripode arms in a substantially play-free way. In this way, the roller carriers are axially displaceable and swingingly movable relative to the tripode arm. In this way, it is ensured that, when an outer joint part and an inner joint part of a tripode joint rotate with one another in an angular position relative to one another, the tripode rollers supported on the roller carriers can be guided, so as to carry out a pure rolling contact movement in the tracks of the outer joint part, with the axes of the tripode rollers always being parallel relative to themselves.

Tripode stars/inner joint parts of the above-mentioned type have so far been produced by using a cylindrical blank for forming the hub member and the three arms by forward extrusion by means of a tool divided in the plane containing the arm axes, as a result of which there occurs a burr extending in the central plane of the tripode star. During a subsequent production stage, which is not essential in this connection, first, the hub member is provided with a bore. This operation is followed by machining processes removing the burr which emerged during the deformation of the blank at least in the region of the faces of the spherical portions at the arms, which faces have to comprise a good surface quality as functional faces, which cooperate with the axial bores of the roller carriers. Said machining processes can take place in the form of hard-turning or grinding carried out at the already hardened tripode star.

SUMMARY OF THE INVENTION

It is the object of the present invention to simplify the forming method used for the tripode stars of tripode joints of said type.

The objective is achieved in that, first, as before, in a first production stage, the hub member and the three arms are pre-formed from a blank by means of a tool divided in the plane containing the arm axes and that, in a second production stage, pairs of burr-free faces of spherical portions positioned opposite one another in the circumferential direction relative to the hub member are formed on to the pre-formed arms by means of a tool divided in planes extending through the longitudinal axis and through the arm axes. During the second production stage, the burr which emerged during the first production stage is removed, and there are produced finished functional faces which do not need any subsequent machining and whose surface roughness is clearly reduced. It is appreciated that, during the first production stage, the faces of the spherical portions at the arms have to be pre-formed as far as possible, but still comprising the material allowance required for the second production stage.

It is possible, for the centers of the provisional faces of the spherical portions, after the first production stage, still to be positioned at a certain distance from the longitudinal axis and to assume their final position on a so-called pitch circle diameter only during the second production stage.

According to a particularly preferable embodiment, it is proposed that, in the course of the first production stage, the arms are formed so as to comprise flattened portions arranged opposite one another in the direction of the longitudinal axis of the hub member. In this way it becomes possible, during the second production stage, for the arms to grow in this region, without their design-related functions being adversely affected, i.e. the remaining flattened portions are still positioned inside the spherical contour complementing faces of the spherical portions and thus within the bore diameter of the roller carrier. Analogously, the same applies to the arm heads radially growing into an outer free space in the tools for the purpose of carrying out the second production stage.

According to a first embodiment of the inventive method, the tripode star, during the second production stage, can be held radially floatingly relative to the second tool in that clamping tongs for example hold the hub member in an accurate axial alignment only.

According to a second embodiment of the inventive method, the tripode star, during the second production stage, can be held so as to be firmly supported relative to the second tool, for example in a third tool which is divided in a plane containing the arm axes.

The forming process carried out on the arms in the second production stage can take place in three individual operations or in one single forming operation.

In any case, an inventive tool for carrying out the second production stage is characterised by at least one set of tools including of two symmetric mold halves for forming a tripode arm, which tool set is divided in a plane extending through the longitudinal axis and through an arm axis. These characteristics apply regardless of whether the second production stage is carried out for each arm individually or for all three arms simultaneously. In a preferred embodiment, the at least one tool set is open at the arm end faces positioned opposite one another in the direction of the longitudinal axis.

In one embodiment of the tool for carrying out the second production stage at one tripode arm only, the mold halves of the one single tool set are designed so as to be linearly guided and movable in opposite directions perpendicularly relative to the dividing plane.

A further embodiment of the tool for simultaneously carrying out the second production stage on all three arms is characterised in that the tool comprises three circumferentially distributed tool sets with mold halves with outer tool faces positioned approximately radially relative to the longitudinal axes and with three wedge elements which are positioned between the tool sets, which can be moved radially inwardly and whose wedge faces cooperate with the outer tool faces of adjoining tool sets. All mold halves can be designed so as to be movable independently of one another and held in a cylindrical ring, or there can be provided three first mold halves which are independent of one another and are held in a cylindrical ring, whereas three second complementary mold halves are firmly connected to one another by a disc, or three first mold halves can be firmly connected to one another by a first disc, with three second complementary mold halves being firmly connected to one another by a second disc.

A further embodiment of the tool for carrying out this production stage is characterised in that the tool comprises three circumferentially distributed tool sets with mold halves with outer tool faces which are arranged in pairs, which extend parallel to the arm axes and which are positioned wedge-like relative to one another and with three wedge elements which can be moved axially in the longitudinal direction, which are positioned between the tool sets and which are supported in a cylindrical ring and which, by means of their wedge faces, cooperate with the outer tool faces of adjoining tool sets.

One tool, by means of which the arms can be machined only individually during the second production stage, but which permits the complete tripode star to be securely supported during this forming operation is characterised in that the mold halves are provided in the form of a pair of punches which are guided in transverse bores of a holding tool which receives the complete tripode star and which is divided in the plane containing the arm axes.

BRIEF DESCRIPTION OF THE DRAWINGS

An inventive tripode star and tools for carrying out the inventive method are illustrated in the drawings described below.

DETAILED DESCRIPTION OF THE INVENTION

Figure 1:
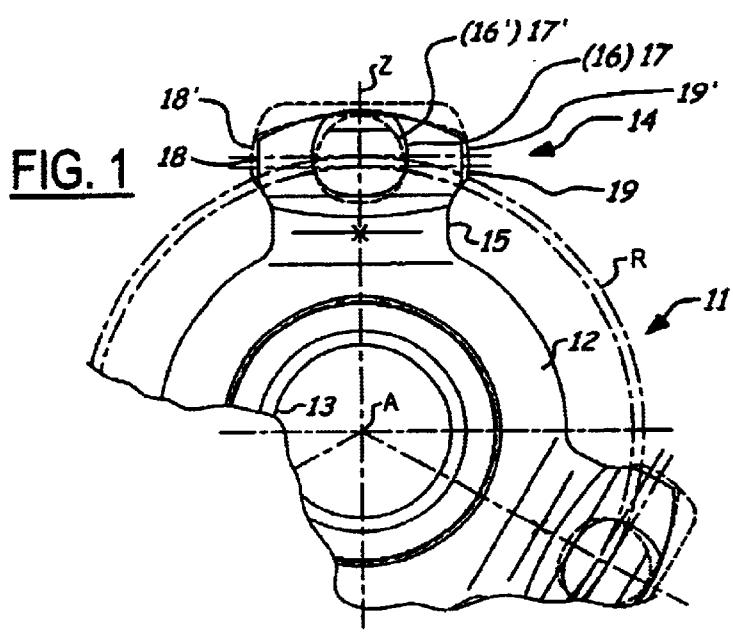
FIG. 1 is a plan view in the direction of the longitudinal axis of a tripode star after the two forming stages in accordance with the invention have been carried out.

FIG. 1 shows a tripode star 11 comprising an annular hub member 12 with an inner bore 13, and two of three circumferentially distributed arms 14. The arms 14 comprise a neck 15 with a smaller diameter. The arm head 14 is shown to comprise flattened portions 16, 17 positioned opposite one another in the axial direction of the hub member, as well as faces 18, 19 of spherical portions positioned opposite one another in the circumferential direction of the hub member. The centers of said faces of the spherical portions are positioned on the arm axes Z and determine the so-called pitch circle R. All contours are shown in continuous lines after the second production stage has been carried out, whereas dashed lines indicate the contours existing after the first production stage. The Figure makes it clear that the hub member 12 and the arm necks 15 are finished-formed even after the first production stage, whereas the arms 14 themselves are still formed during the second production stage in respect of all their details, in particular as regards the position of the centers relative to the longitudinal axis A. The first production stage is carried out by a first tool (not shown) divided in the plane extending through the three arm axes Z, whereas the second tools for the second production stage are illustrated in the subsequent drawings.

Figure 2:
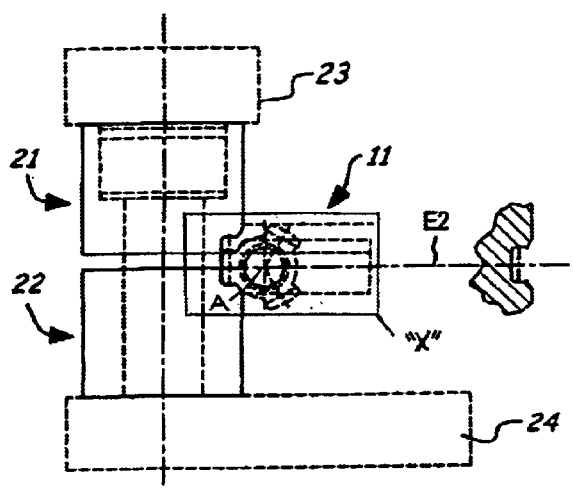
FIG. 2 shows an inventive tool for carrying out the second production stage.
Figure 2:
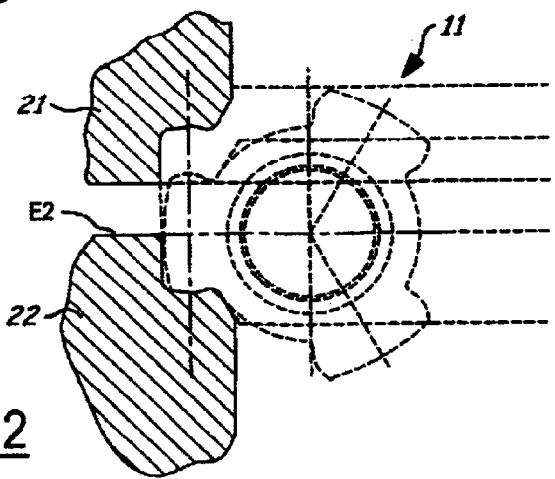

FIG. 2 shows a tool with a tool set 21, 22 for forming an individual arm in a second production stage, which tool is divided in a plane E2 extending through the longitudinal axis A and an arm axis Z and of which the upper mold half 21 is connected to an upper punch 23 and the lower mold half 22 to a lower punch 24. In the direction of the axis A, the tool set 21, 22 leaves openings extending in opposite directions, so that, while the faces 18, 19 of the spherical portions are being formed, material is able to flow towards the end faces 16, 17 of the individual arms 14, which end faces 16, 17 are positioned opposite one another in the longitudinal direction. The tool illustrated here is suitable for forming only one arm at a time, so that the second production stage has to be carried out for each arm individually, one after the other.

Figure 3A:
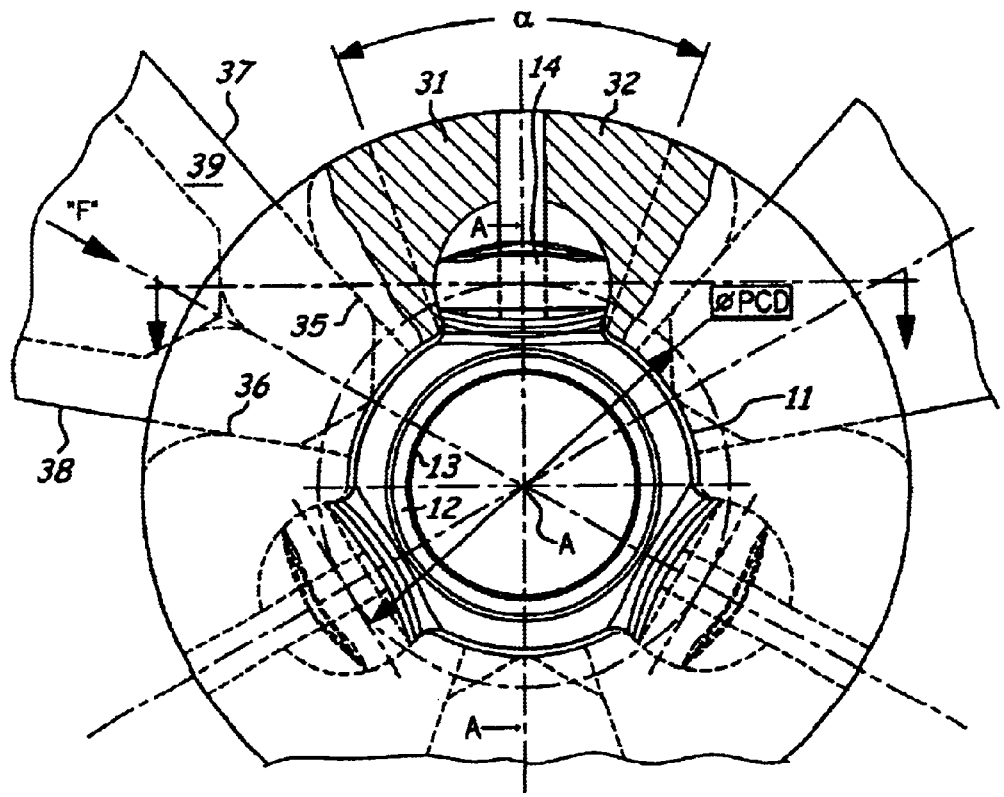
FIG. 3 shows an inventive tool in a second embodiment
 a) in an axial view
 b) in a section extending perpendicularly relative to an arm axis.
Figure 3B:
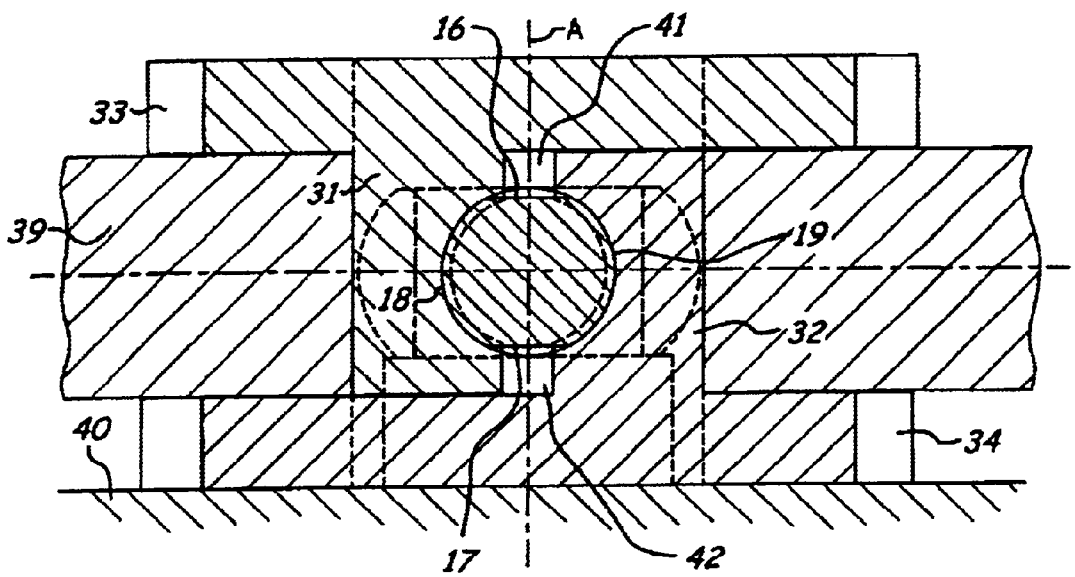

FIG. 3 shows a tool with three uniformly circumferentially distributed tool sets each comprising of two mold halves 31, 32 positioned on a table 40. The three first mold halves are firmly connected to one another by an upper disc and the three complementary mold halves are firmly connected to one another by a lower disc 34. Alternatively, three of the mold halves could be firmly connected to the table 33 or a disc, with only the complementary three mold halves being individually floatingly arranged while being held in a cylindrical ring. However, it would also be possible for all mould halves to be inserted into a cylindrical ring so as to be freely adjustable in the circumferential direction. The angle α indicates the possible opening angle between the mold halves after the wedge tools 39 have been withdrawn. The mold halves comprise tool reverse sides 35, 36 which are positioned approximately radially relative to the axis A and which cooperate with wedge faces 37, 38 of wedge tools 39 which are arranged between each two tool sets 31, 32 and which can be fed in radially. It can be seen quite clearly that at the respective end faces 16, 17 of the arms 14, the tool sets produce recesses 41, 42, with material flowing into same during the subsequent forming of the faces 18, 19 of the spherical portions. However, the material has to remain within the sphere complementing the faces 18, 19 of the spherical portions. F refers to the force applied to the wedge tools 39. All the remaining details have been given the same reference numbers as used in the previous Figures. Reference is therefore made to the respective description.

Figure 4A:
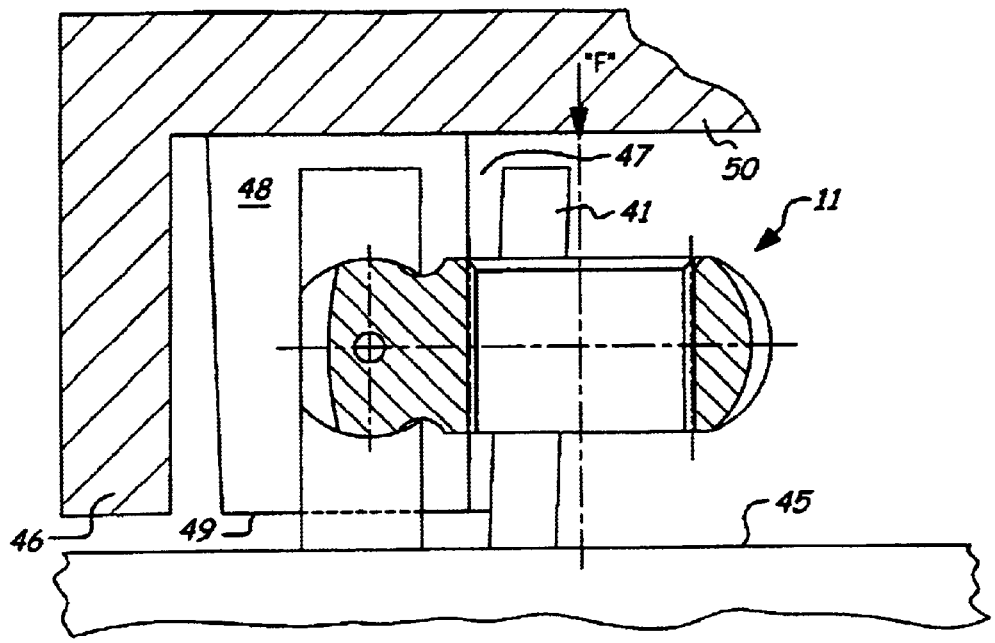
FIG. 4 shows an inventive tool in a third embodiment
 a) in an axial view
 b) in a section through the longitudinal axis.
Figure 4B:
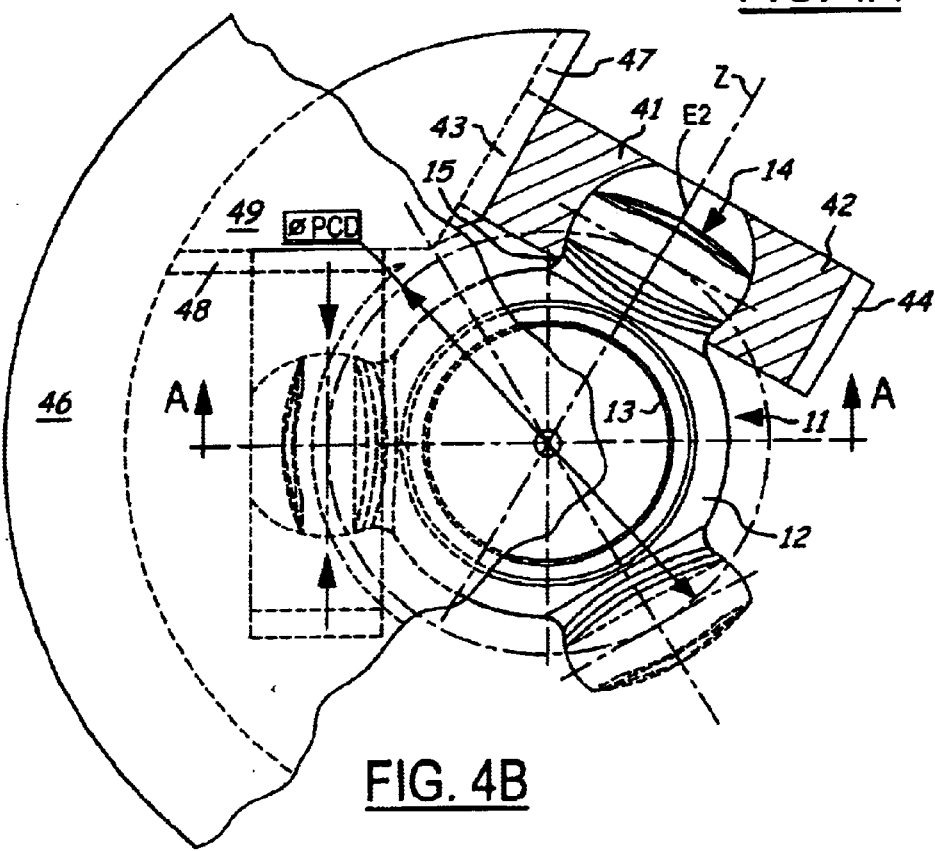

FIG. 4 shows a tool with three uniformly circumferentially distributed tool sets 41, 42 whose mold halves comprise tool reverse sides 43, 44 which are arranged wedge-like relative to one another and are positioned parallel to the arm axes Z. The mold halves 41, 42 are supported on a table 45. The wedge reverse sides 43, 44 of two adjoining tool sets cooperate with three wedge elements 49 which comprise wedge faces 47, 48 inclined in opposite directions and which, in turn, are held in a cylindrical ring 46 with a base plate 50, which cylindrical ring 46 can be fed against the table 45 by force F. All the remaining details have been given the same reference numbers as used in the previous Figures. Reference is therefore made to the respective description.

Figure 5A:
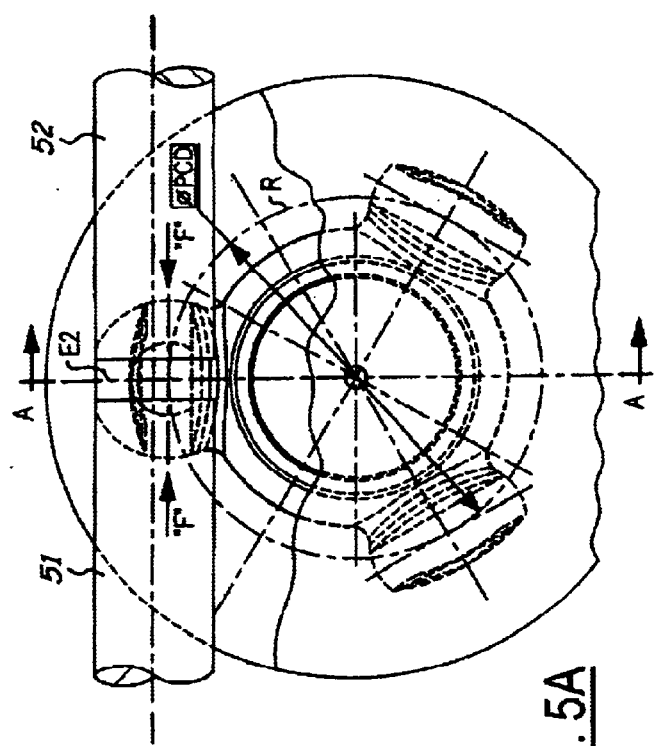
FIG. 5 shows an inventive tool in a fourth embodiment
 a) in an axial view
 b) in a section extending perpendicularly relative to the arm axis
 c) in a section through the longitudinal axis.
Figure 5B:
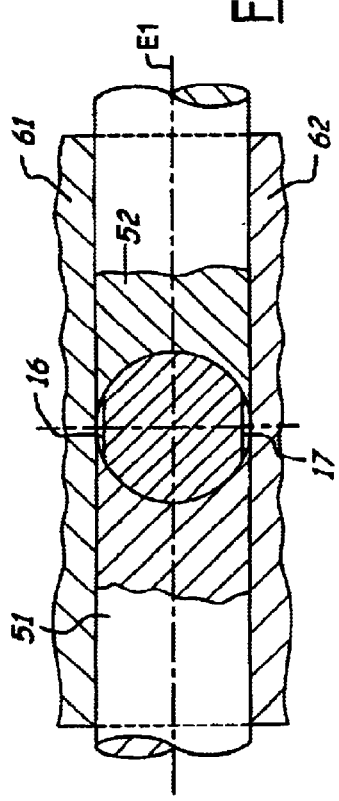
Figure 5C:
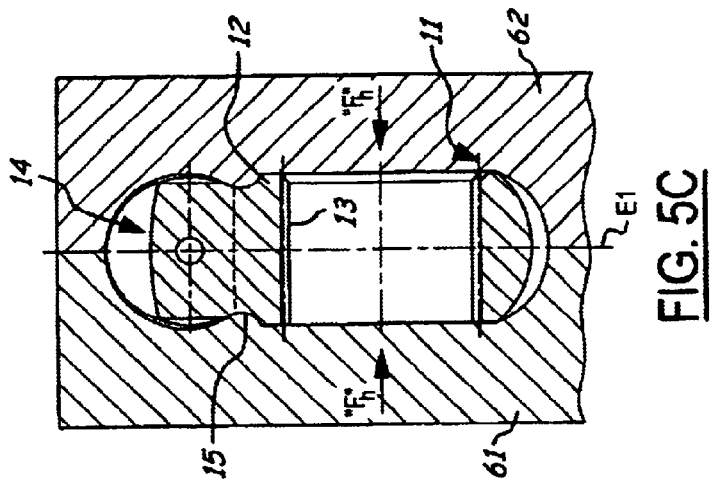

FIG. 5 shows a tool with one single tool set 51, 52 whose mold halves are provided in the form of punches which are guided in the receiving halves 61, 62 of a holding tool which, in turn, is divided in a plane E1 contained in a plane extending through the arm axis Z. In respect of its mold cavity and division, said holding tool substantially corresponds to a first tool (not shown in this Figure) for carrying out the first production stage. The mold halves 51, 52 which are divided in the plane E2 are moved towards each other by forces F to be able to carry out the second production stage.

At the same time, the receiving halves 61, 62 are held together by forces $F_h$ for the purpose of fixing the tripode star. All further details have been given the same reference numbers as used in the previous Figures. Reference is therefore made to the respective description.

What is claimed is:

1. A method of forming a tripode star for a tripode joint, said tripode star comprising an annular hub.

2. A method according to claim 1 wherein pre-forming the hub member and the three arms includes forming the arms so as to comprise flattened portions arranged opposite one another in the direction of the longitudinal axis (A) of the hub member.

3. A method according to claim 1 wherein forming pairs of burr-free faces includes holding the tripode star so as to be radially floating relative to the second tool.

4. A method according to claim 2 wherein forming pairs of burr-free faces includes holding the tripode star so as to be radially floating relative to the second tool.

5. A method according to claim 1 wherein forming pairs of burr-free faces includes firmly supporting the tripode star relative to the second tool.

6. A method according to claim 2 wherein forming pairs of burr-free faces includes firmly supporting the tripode star relative to the second tool.

7. A forming tool for producing a tripode star for a tripode joint, said tripode star comprising an annular hub member and three arms which adjoin the hub member and extend radially relative to a longitudinal axis (A) of the hub member, and wherein each arm includes pairs of burr-free faces of spherical portions positioned opposite one another in a circumferential direction relative to the hub member and positioned circumferentially relative to an arm axis (Z) of the respective arm, the tool comprising:

at least one tool set comprising two symmetric mold halves for forming a tripode arm, said tool set being divided in a plane (E2) extending through the longitudinal axis (A) and the respective arm axis (Z).

8. A forming tool according to claim 7 wherein each arm includes flattened portions positioned opposite one another in the direction of the longitudinal axis (A) wherein the at the at least one tool set is open at the flattened portions of the respective tripode arm.

three wedge elements positioned between the tool sets and supported by a cylindrical ring, said wedge elements being adapted to be fed axially in the longitudinal direction, and each including wedge faces which cooperate with the outer tool faces of adjoining tool sets.

9. A forming tool according to claim 7 wherein the mold halves are linearly guidable and movable in opposite directions, perpendicular relative to the plane (E2).

10. A forming tool according to claim 8 wherein the mold halves are linearly guidable and movable in opposite directions, perpendicular relative to the plane (E2).

11. A forming tool according to claim 7 comprising:

three tool sets circumferentially distributed around the longitudinal axis (A) and each comprising two mold halves having outer tool faces positioned approximately radially relative to the longitudinal axis (A), wherein all of said mold halves are supported in a cylindrical ring; and three wedge elements positioned between the tool sets, said wedge elements being adapted to be fed radially inwardly and each including wedge faces which cooperate with the outer tool faces of adjoining tool sets.

12. A forming tool according to claim 8 comprising:

three tool sets circumferentially distributed around the longitudinal axis (A) and each comprising two mold halves having outer tool faces positioned approximately radially relative to the longitudinal axis (A), wherein all of said mold halves are supported in a cylindrical ring; and three wedge elements positioned between the tool sets, said wedge elements being adapted to be fed radially inwardly and each including wedge faces which cooperate with the outer tool faces of adjoining tool sets.

13. A forming tool according to claim 7 comprising:

three tool sets circumferentially distributed around the longitudinal axis (A) and each comprising two mold halves having outer tool faces positioned approximately radially relative to the longitudinal axis (A), wherein three of said mold halves are supported in a cylindrical ring and three of said mold halves are connected to one another by a disc; and three wedge elements positioned between the tool sets, said wedge elements being adapted to be fed radially inwardly and each including wedge faces which cooperate with the outer tool faces of adjoining tool sets.

14. A forming tool according to claim 8 comprising:

three tool sets circumferentially distributed around the longitudinal axis (A) and each comprising two mold halves having outer tool faces positioned approximately radially relative to the longitudinal axis (A), wherein three of said mold halves are supported in a cylindrical ring and three of said mold halves are connected to one another by a disc; and three wedge elements positioned between the tool sets, said wedge elements being adapted to be fed radially inwardly and each including wedge faces which cooperate with the outer tool faces of adjoining tool sets.

15. A forming tool according to claim 7 comprising:

three tool sets circumferentially distributed around the longitudinal axis (A) and each comprising two mold halves having outer tool faces positioned approximately radially relative to the longitudinal axis (A), wherein three of said mold halves are connected to one another by a first disc, and three complementary mold halves are connected to one another by a second disc; and three wedge elements positioned between the tool sets, said wedge elements being adapted to be fed radially inwardly and each including wedge faces which cooperate with the outer tool faces of adjoining tool sets.

16. A forming tool according to claim 8 comprising:

three tool sets circumferentially distributed around the longitudinal axis (A) and each comprising two mold halves having outer tool faces positioned approximately radially relative to the longitudinal axis (A), wherein three of said mold halves are connected to one another by a first disc, and three complementary mold halves are connected to one another by a second disc; and three wedge elements positioned between the tool sets, said wedge elements being adapted to be fed radially inwardly and each including wedge faces which cooperate with the outer tool faces of adjoining tool sets.

17. A forming tool according to claim 7 comprising:

three tool sets circumferentially distributed around the longitudinal axis (A) and each comprising two mold halves having outer tool faces positioned, in pairs, in parallel to respective arm axis and arranged wedge-like relative to one another; and three wedge elements positioned between the tool sets and supported by a cylindrical ring, said wedge elements being adapted to be fed axially in the longitudinal direction, and each including wedge faces which cooperate with the outer tool faces of adjoining tool sets.

18. A forming tool according to claim 8 comprising:
three tool sets circumferentially distributed around the longitudinal axis (A) and each comprising two mold halves having outer tool faces positioned, in pairs, in parallel to respective arm axis and arranged wedge-like relative to one another; and member and three arms which adjoin the hub member and extend radially relative to a longitudinal axis (A) of the hub member, and wherein each arm includes faces of spherical portions each positioned circumferentially relative to an arm axis (Z) of the respective arm, the method comprising:

first, pre-forming the hub member and the three arms from a blank with a first tool divided in a plane (E1) containing the arm axes (Z); and second, forming pairs of burr-free faces of spherical portions positioned opposite one another in a circumferential direction relative to the hub member on to the preformed arms with a second tool divided in planes (E2) extending through the longitudinal axis (A) of the hub member and through the arm axes (Z).

19. A forming tool according to claim 9 wherein the mold halves comprise a pair of punches which are guided in transverse bores of a holding tool which accommodates the entire tripode star and which is divided in a plane (E1) containing the arm axes (Z).

20. A forming tool according to claim 10 wherein the mold halves comprise a pair of punches which are guided in transverse bores of a holding tool which accommodates the entire tripode star and which is divided in a plane (E1) containing the arm axes (Z).

* * * * *

UNITED STATES PATENT AND TRADEMARK OFFICE
CERTIFICATE OF CORRECTION

PATENT NO. : 6,708,549 B2
APPLICATION NO. : 10/148251
DATED : March 23, 2004
INVENTOR(S) : Volker Hainz, Norbert Hofmann and Michael Ricks It is certified that error appears in the above-identified patent and that said Letters Patent is hereby corrected as shown below:

Column 5:

Claim 1, should read as follows:

-- A method of forming a tripode star for a tripode joint, said tripode star comprising an annular hub member and three arms which adjoin the hub member and extend radially relative to a longitudinal axis (A) of the hub member, and wherein each arm includes faces of spherical portions each positioned circumferentially relative to an arm axis (Z) of the respective arm, the method comprising:

first, pre-forming the hub member and the three arms from a blank with a first tool divided in a plane (E1) containing the arm axes (Z); and second, forming pairs of burr-free faces of spherical portions positioned opposite one another in a circumferential direction relative to the hub member on to the preformed arms with a second tool divided in planes (E2) extending through the longitudinal axis (A) of the hub member and through the arm axes (Z). --

Claim 8, should read as follows:

-- A forming tool according to claim 7 wherein each arm includes flattened portions positioned opposite one another in the direction of the longitudinal axis (A) wherein the at the at least one tool set is open at the flattened portions of the respective tripode arm. --

UNITED STATES PATENT AND TRADEMARK OFFICE
CERTIFICATE OF CORRECTION

PATENT NO. : 6,708,549 B2
APPLICATION NO. : 10/148251
DATED : March 23, 2004
INVENTOR(S) : Volker Hainz, Norbert Hofmann and Michael Ricks It is certified that error appears in the above-identified patent and that said Letters Patent is hereby corrected as shown below:

In The Claims:

Claim 18, should read as follows:

-- A forming tool according to claim 8 comprising:

three tool sets circumferentially distributed around the longitudinal axis (A) and each comprising two mold halves having outer tool faces positioned, in pairs, in parallel to respective arm axis and arranged wedge-like relative to one another; and three wedge elements positioned between the tool sets and supported by a cylindrical ring, said wedge elements being adapted to be fed axially in the longitudinal direction, and each including wedge faces which cooperate with the outer tool faces of adjoining tool sets. --

Signed and Sealed this

Eleventh Day of September, 2007

JON W. DUDAS
*Director of the United States Patent and Trademark Office*